United States Patent [19]

Dutka

[11] Patent Number: 6,011,509
[45] Date of Patent: Jan. 4, 2000

[54] APPARATUS AND METHOD FOR DETERMINATION OF A RECEIVER POSITION

[75] Inventor: Stephen C. Dutka, Aurora, Colo.

[73] Assignee: Raytheon Company, Lexington, Mass.

[21] Appl. No.: 09/318,337

[22] Filed: May 25, 1999

[51] Int. Cl.[7] .............................. G01S 5/02; H04B 7/185
[52] U.S. Cl. ............................... 342/357.06; 342/357.01; 701/213
[58] Field of Search ......................... 342/357.01, 357.06, 342/352; 701/213, 214; 455/12.1

[56] References Cited

U.S. PATENT DOCUMENTS

| | | | |
|---|---|---|---|
| 5,451,964 | 9/1995 | Babu | 342/357 |
| 5,523,763 | 6/1996 | Loomis | 342/357 |

OTHER PUBLICATIONS

Braasch, Michael S. Dr., AnnMarie Fink, and Keith Duffus, "Improved Modeling of GPS Selective Availability", IoN National Technology Meeting, pp. 121–130, Jan. 20–22, 1993.

Dundzila, Antanas V. (submitted by), Applications Contest/Contest Entires, "Affordable Accuracy", GPS World Showcase Magazine, Aug. 1998.

Dana, Peter H., Deparatment of Geography, University of Texas at Austin, "Global Positioning System Overview", http://www.utexas.edu/depts/grg/gcraft/notes/gps/gps.html, pp. 1–12, Feb. 8,1999.

Dana, Peter H., Department of Geography, University of Texas at Austin, "GPS Satellite Almanac Data Samples", http://www.utexas.edu/depts/grg/gcraft/notes/gps/almanacs.html, pp. 1–16, Feb. 8, 1999.

Jurka, Kristopher, "GPS Errors", http://www3.hmc.edu/~kjurka/physics/error.html, pp. 1–2, Feb. 8, 1999.

Author unknown, "Ephemeris Data Set Used in Pseudo–Rnage Navigation Examples (GPS Time=150000 seconds)", http://www.utexas.edu/depts/grg/gcraft/notes/gps/gif/eph-data.gif, p. 1 of 1, Feb. 8, 1999.

Dana, Peter H., "GPS Pseudorange Navigation Example", http://www.utexas.edu/depts/grg/gcraft/notes/gps/gif/navigate.gif, p. 1 of 1, Feb. 8, 1999.

Dana, Peter H., "Simplfied GPS Receiver Block Diagram", http://www.utexas.edu/depts/grg/gcraft/notes/gps/gif/receiver.gif, p. 1 of 1, Feb. 8, 1999.

Dana, Peter H., "Poor GDOP", http://www.utexas.edu/depts/grg/gcraft/notes/gps/gif/poorgdop.gif, p. 1 of 1, Feb. 8, 1999.

Author unknown, "Good GDOP—Bad Visibility", http://www.utexas.edu/depts/grg/gcraft/notes/gps/gif/good-badg.gif, p. 1 of 1, Feb. 8, 1999.

Dana, Peter H., "GPS GDOP Example", http://www.utexas.edu/depts/grg/gcraft/notes/gps/gif/gdop.gif, p. 1 of 1, Feb. 8, 1999.

(List continued on next page.)

*Primary Examiner*—Thomas H. Tarcza
*Assistant Examiner*—Dao L. Phan
*Attorney, Agent, or Firm*—Baker & Botts, L.L.P.

[57] ABSTRACT

A method of accurate determination of a fixed position using global positioning system uses pseudo-range output over a predetermined measurement period from a stand-alone GPS receiver located at the fixed position, the pseudo-range output being measured from an ensemble of space vehicles at each time t over the measurement period, and historical ephemerides of the ensemble of space vehicles over the same measurement period to eliminate errors caused by selective availability. The historical ephemerides of the ensemble of space vehicles corresponding to each measurement time t are determined, and using the pseudo-range output and the historical ephemerides, a position solution at each time t is computed. The accurate position in earth-centered earth-fixed coordinates is then the average of all the position solutions at each time t over the measurement period.

13 Claims, 2 Drawing Sheets

OTHER PUBLICATIONS

Dana, Peter H., "GPS Satellite Signals", http://www.utexas.edu/depts/grg/gcraft/notes/gps/gif/signals.gif, p. 1 of 1, Feb. 8, 1999.

Author unknown, "Trimble GPS Contents", http://www.trimble.com/gps/contents/aa_c3.htm, p. 1 of 1, Feb. 8, 1999.

Author unknown, Trimble Navigation Limited, "Trimble How GPS Works—Error Modeling", http://www.trimble.com/gps.howworks/moreinfo3/aa_m31.htm, p. 1 of 1, Feb. 8, 1999.

Author unknown, Trimble Navigation Limited, "Trimble How GPS Works—Ephemeris Errors", http://www.trimble.com/gps.howworks/moreinfo3/aa_m3o.htm, p. 1 of 1, Feb. 8, 1999.

APPARATUS AND METHOD FOR DETERMINATION OF A RECEIVER POSITION

TECHNICAL FIELD OF THE INVENTION

This invention is related in general to the field of satellite receivers. More particularly, the invention is related to an apparatus and a method for determination of a receiver position, using GPS (global positioning system).

BACKGROUND OF THE INVENTION

Global positioning system (GPS) has been used for navigation and survey purposes for civilian and military applications. Global positioning system uses a constellation of orbiting satellites or space vehicles (SVs) that send radio signals to earth. The current constellation includes at least 24 operational satellites, which provides between five to eight space vehicles visible from any point on earth. Using the signals received from at least four of the visible space vehicles (the ensemble), an earth position (X,Y,Z) and time of a user can be computed. Typical applications of a global positioning system includes navigation aide and surveying.

There are two global positioning system services available. The Precise Positioning Service (PPS) is intended for military and select government agency users. The accuracy of the Standard Positioning Service (SPS), designated for civilian applications, is intentionally degraded to provide predictable accuracies of only 100 meters in the horizontal plane. The mechanism by which this intentional degradation is achieved is called selective availability (SA). Selective availability has two components: satellite clock dither ($\delta$) and manipulation of the broadcast ephemeris data ($\epsilon$). The selective availability bias on each satellite signal is different, resulting in a position solution that is a function of the combined selective availability bias from each space vehicle in the ensemble. Selective availability constitutes the largest component of error in the position solution.

Differential global positioning systems have been used to correct selective availability errors to improve the accuracy of the position solution. The differential technique uses bias errors measured by a receiver at a known position to correct the bias errors at a receiver with an unknown position. Therefore, differential global positioning system removes correlated errors measured by two or more receivers from the same ensemble of space vehicles. This differential technique is known as the local area differential global positioning system (LADGPS). However, local area differential global positioning system is useless when the user is remotely located from reference receivers.

When accuracy is required for users over a large region, a second differential technique known as the wide area differential global positioning system (WADGPS) may be used. This technique uses a network of intercommunicating reference stations that work in conjunction to overcome errors originating from sources such as selective availability. However, the control and communication schemes for the network of reference stations are complex and costly to operate.

SUMMARY OF THE INVENTION

Accordingly, there is a need for a receiver or method to accurately determine the position solution with the errors introduced by selective availability substantially eliminated without requiring the use of differential global positioning systems.

In accordance with the present invention, a system and method of determining an accurate fixed position are provided which eliminate or substantially reduce the disadvantages associated with prior systems and methods.

In one aspect of the invention, a method of accurate determination of a fixed position using global positioning system uses pseudo-range output over a predetermined measurement period from a stand-alone GPS receiver located at the fixed position, the pseudo-range output being measured from an ensemble of space vehicles at each time t over the measurement period, and historical ephemerides of the ensemble of space vehicles over the same measurement period to eliminate errors caused by selective availability. The historical ephemerides of the ensemble of space vehicles corresponding to each measurement time t are determined, and using the pseudo-range output and the precise ephemerides, a position solution at each time t is computed. The accurate position in earth-centered earth-fixed coordinates is then the average of all the position solutions at each time t over the measurement period.

The aspect of the invention is a stand-alone global positioning system (GPS) receiver having a post-processor for accurate determination of a fixed position is provided. The post-processor is adapted to receive a plurality of pseudo-range measurements over a predetermined measurement period (the pseudo-range measurements being determined from an ensemble of space vehicles at each time t over the measurement period), obtain historical ephemerides of the ensembles of space vehicles over the measurement period (the historical ephemerides being free of the selective availability broadcast ephemeris error), determine the historical ephemerides of the ensemble of space vehicles corresponding to each time t in response to the obtained historical ephemerides, use the plurality of pseudo-range measurements and the historical ephemerides to determine a position solution at each time t, and average the position solutions over the measurement period.

A technical advantage of the present solution is the provision of a post-processing system and method that substantially eliminates the broadcast ephemeride errors, $\epsilon$, and reduces the space vehicle clock dither, $\delta$, through averaging of the position solution data without the use of costly DGPS and WADGPS.

BRIEF DESCRIPTION OF THE DRAWINGS

For a better understanding of the present invention, reference may be made to the accompanying drawings, in which.

DETAILED DESCRIPTION OF THE INVENTION

Figure 1:
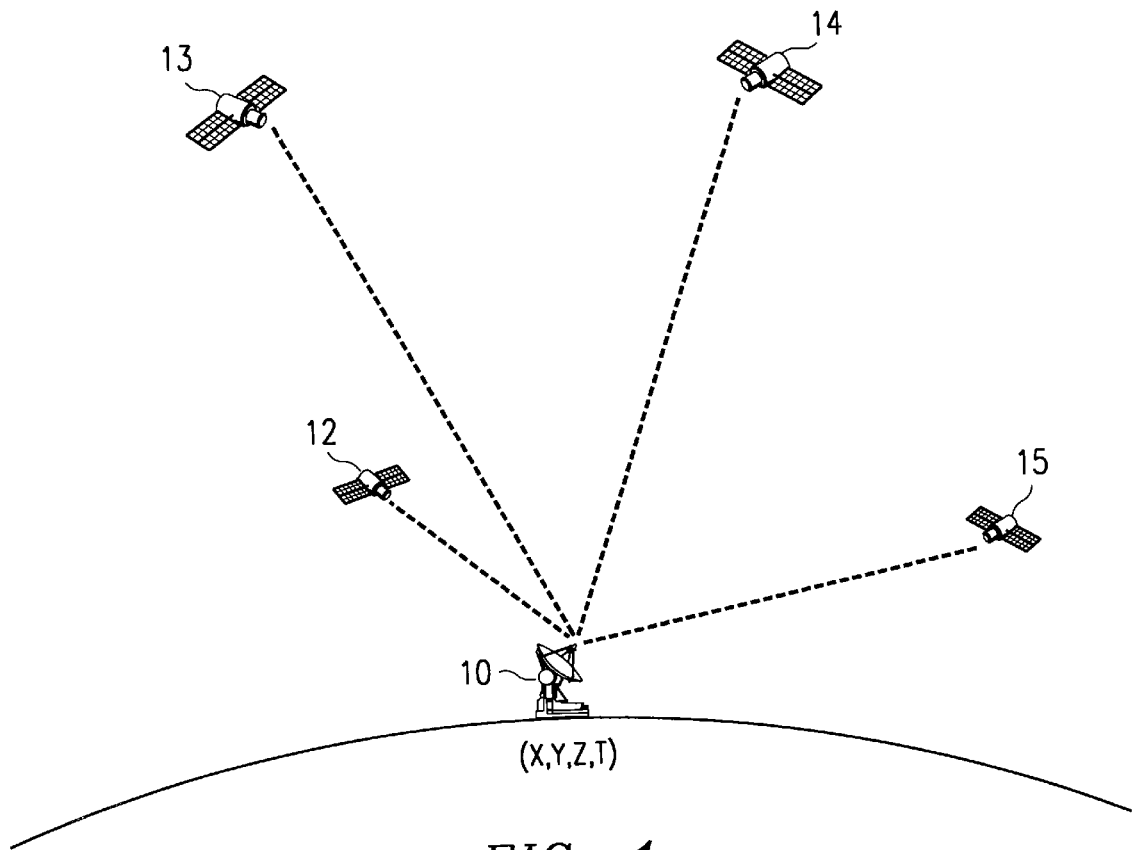
FIG. 1 is a schematic representation of a receiver receiving radio signals from four space vehicles to determine the position of the receiver according to an embodiment of the present invention.

Referring to FIG. 1, a receiver 10 is shown receiving radio signal transmissions from four space vehicles 12–15. The set of space vehicles used to determine the position is commonly called the ensemble. Using the radio signal transmissions from at least these space vehicles 12–15, the earth-centered earth-fixed (ECEF) coordinates (X,Y,Z) or the position of receiver 10 as well as the time, T, of the radio signal transmission can be instantaneously computed. However, as outlined in the Background portion above, the computed instantaneous position of receiver 10, is intentionally degraded by the U.S. Department of Defense to provide predictable accuracies of only 100 meters in the horizontal plane and 156 meters in the vertical plane.

The mechanism by which this intentional degradation is achieved is called selective availability (SA). Selective availability has two components: satellite clock dither ($\delta$) and manipulation of the broadcast ephemeris data ($\epsilon$). The selective availability bias on each satellite signal is different, resulting in a position solution that is a function of the combined selective availability bias from each space vehicle in the ensemble. Selective availability constitutes the largest component of error in the position solution. The present invention corrects for this error to make the position solution more accurate.

The position solution of receiver 10 is determined by the intersection of pseudo-ranges of the ensemble of space vehicles 12–15. The pseudo-range measurement is the distance from a space vehicle to the receiver determined by measuring the propagation time required for a ranging code generated by the space vehicle to travel from the space vehicle to the receiver. The pseudo-range measurements are used together with space vehicle position estimates based on the orbital elements (the ephemeris data) broadcast by each space vehicle and a receiver position estimate to determine the current receiver position. However, with selective availability, the accuracy of the receiver position solution is severely degraded. The present invention provides for an accurate position solution of a fixed receiver without the use of differential receivers. Note that the ensemble may constitute different number of different space vehicles over the measurement period as space vehicles rise and set over the horizon and the selection of the space vehicles according to geometric dilution of precision and visibility.

Figure 2:
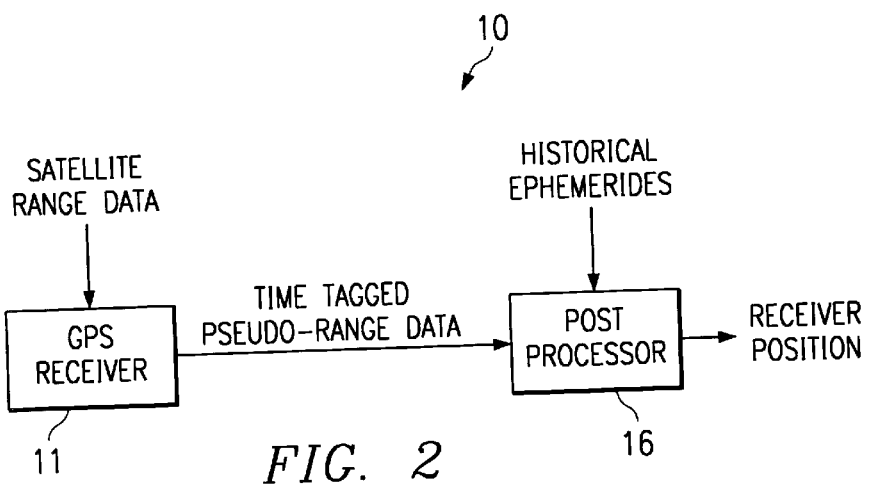
FIG. 2 is a functional block diagram of an embodiment of the present invention.

Referring to FIG. 2, receiver 10 includes a GPS receiver 11 which receives range data from space vehicles 12–15. The range data may include clock data, ephemeris data, and almanac data. GPS receiver 11 measures pseudo-range data of the space vehicles for each time t during the measurement period. A post-processor 16 receives the pseudo ranges, time-tagged by the receiver, and historical ephemerides and computes a receiver position according to the teachings of the present invention. The construction of receiver 11 is generally known in the art and may be implemented with commercial available models.

Figure 3:
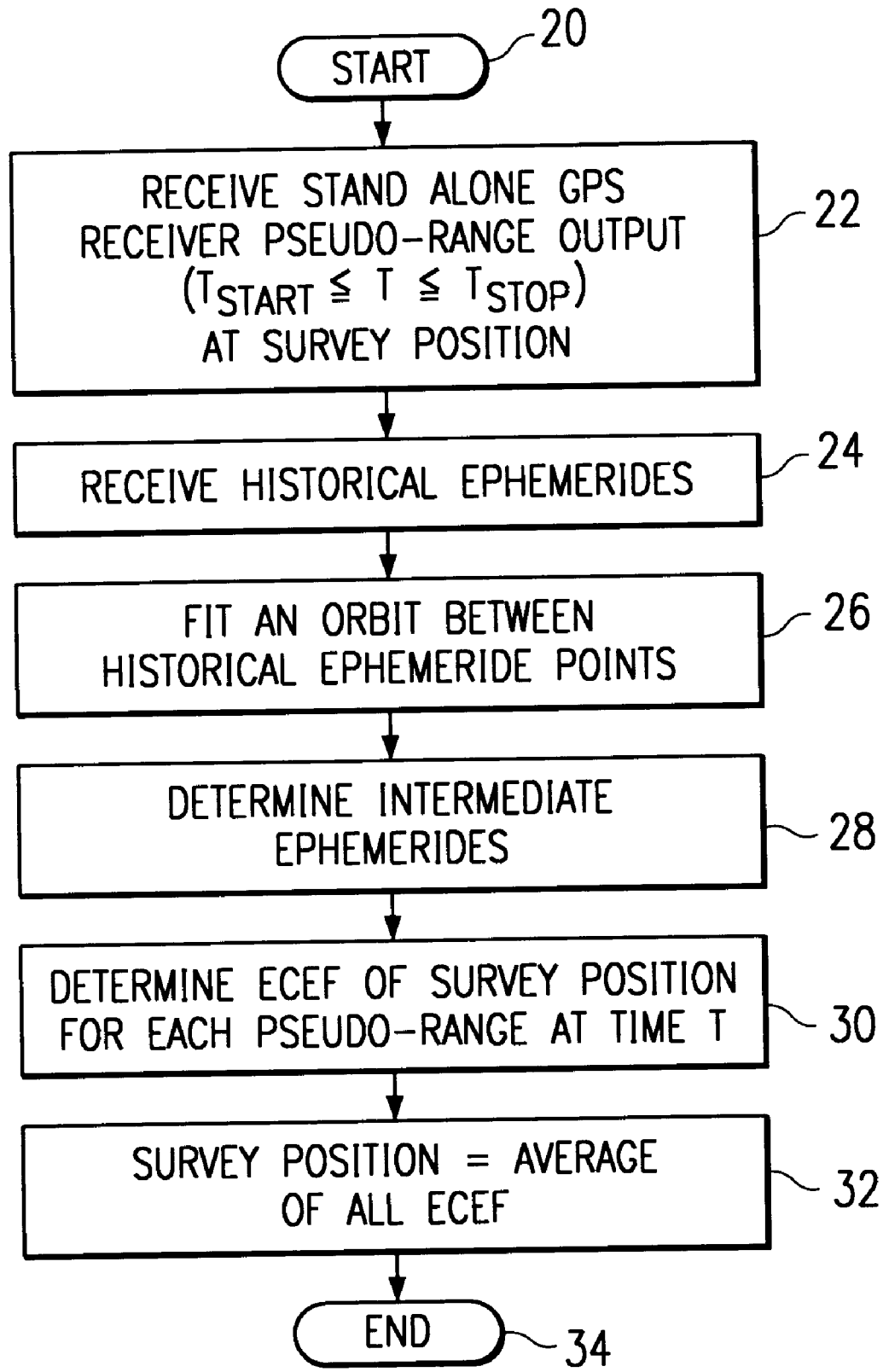
FIG. 3 is a flowchart of an embodiment of a process for accurately determining a fixed position constructed according to an embodiment of the present invention.

Referring to FIG. 3, an embodiment of receiver position post-processing apparatus and method according to the present invention is shown in a flowchart which begins in block 20. From a receiver 10 placed at a fixed survey position, the time-tagged pseudo-range output over a measurement period, $T_{START} \leq t \leq T_{STOP}$, are obtained and stored for post-processing. The measurement period may last one to several hours. The pseudo-range output includes the time of the measurement, the space vehicle identifier, and the pseudo-range as a function of the time of arrival of the range signal. These pseudo-ranges are received in block 22. Precise or historical ephemerides over the same measurement period are subsequently obtained and received as input in block 24. Historical ephemerides are available from a number of public and private sources, including the National Geodetic Survey through the Navstar GPS Information Center Bulletin Board. The historical ephemerides are obtained by making range measurements to the space vehicles by a network of tracking stations with known positions. The historical ephemerides provide information on the precise or actual orbital position of the space vehicles. Therefore, the historical ephemerides do not have the inaccuracy introduced into broadcast ephemeris data by selective availability.

In block 26, an orbit is fit between the precise ephemeride points for each space vehicle in the ensemble. The orbit is determined with known Gaussian or Gibbsian orbit determination algorithms, such as ones given in Methods of Orbit Determination, by Pedro Ramon Escobal, John Wiley & Sons, 1976. By determining the precise orbit for each space vehicle in the ensemble over the measurement period the intermediate ephemeride points corresponding to the time of each pseudo-range measurements are obtained, as shown in block 28.

In block 30, the earth-centered earth-fixed (ECEF) in (x,y,z) coordinates of the position of the receiver is computed for each pseudo-range measurement at time t. The algorithm for determining a position using GPS pseudo-ranges is well known. An exemplary method is described below.

Using the precise space vehicle ephemerides $(X,Y,Z)_i$, the range $r_i$ from space vehicle i to the receiver is computed by:

$$r_i = \sqrt{(X_i - x)^2 + (Y_i - y)^2 + (Z_i - z)^2}, \quad (1)$$

where (x,y,z) is the initial guess of the receiver position. With the ranges computed for each space vehicle, the difference, $\Delta\rho$, between the range and the corresponding pseudo-range measurement is computed by:

$$\Delta\rho_i = r_i - pR_i, \quad (2)$$

where $pR_i$ is the measured pseudo-range. The errors in x,y,z can be written as:

$$\Delta xyz = \begin{bmatrix} \Delta x \\ \Delta y \\ \Delta z \end{bmatrix} = K\Delta\rho_i \quad (3)$$

where K is the least squares error solution matrix and can be expressed as:

$$[K] = (H^T H)^{-1} H^T, \quad (4)$$

where [H] is the unit vector matrix from position to GPS solution set. The errors in x,y,z are added to the initial guess to compute a new x,y,z by:

$$\text{new } xyz = \begin{bmatrix} x + \Delta x \\ y + \Delta y \\ z + \Delta z \end{bmatrix} \quad (5)$$

Steps (1) to (5) are iteratively computed until $\Delta xyz$ are close to zero for each pseudo-range measurement. All of the computed (x,y,z) coordinates are then averaged. Averaging the computed position coordinates reduces the effects of selective availability dither and biases.

Operating in this manner, receiver 10 may have a post-processor or incorporate a post-processing method according to the present invention to determine an accurate position which substantially eliminates the errors caused by selective availability without the need of differential GPS receivers. By using historical ephemerides, the broadcast ephemerides error component of selective availability is virtually eliminated. By averaging the solution data, the clock dither error component of selective availability is substantially reduced.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method of determination of a receiver fixed position using global positioning system (GPS), comprising:

obtaining pseudo-range output over a predetermined measurement period from a GPS receiver, the pseudo-range output measured from an ensemble of space vehicles at each of a plurality of times t over the measurement period;

determining the historical ephemerides of the ensemble of space vehicles corresponding to each of the plurality of times t;

determining a position solution for each of the plurality of times t utilizing the pseudo-range output and the ephemerides; and averaging the position solution for each of the times t over the measurement period.

2. The method, as set forth in claim 1, wherein determining historical ephemerides comprises:

determining an orbit defined by the historical ephemerides; and determining intermediate historical ephemerides between the historical ephemerides in the orbit.

3. The method, as set forth in claim 2, wherein determining the orbit comprises fitting an orbit to the historical ephemerides.

4. The method, as set forth in claim 1, wherein determining a position solution for each of the plurality of times t comprises;

determining an initial receiver position;

determining, in response to the historical ephemerides and the initial receiver position, a range from each space vehicle to the receiver;

determining a difference between the range of each space vehicle and the receiver pseudo-range output;

determining errors of the initial receiver position in response to the difference between the range of each space vehicle and the receiver pseudo-range output;

correct the initial receiver position with the errors; and iteratively repeating the above steps until the errors approach zero.

5. The method, as set forth in claim 1, wherein averaging the position solutions comprises:

summing all position solutions of each axis; and dividing the summed position solution for each axis by the number of position solutions in each axis.

6. A method of determination of a receiver position using a stand-alone global positioning system (GPS) receiver, the receiver generating a plurality of pseudo-range data over a measurement period, comprising:

receiving the plurality of pseudo-range data over the measurement period, the pseudo-range data measured for an ensemble of at least four space vehicles at each of a plurality of times t over the measurement period;

receiving historical ephemerides of the same ensemble of space vehicles over the measurement period;

determining from the received ephemerides an orbit for each space vehicle;

determining intermediate historical ephemerides between the historical ephemerides in each orbit for each of the plurality of times t during the measurement period;

determining a position solution for each of the plurality of times t utilizing the plurality of pseudo-range data and the ephemerides; and averaging the position solution for each of the times t over the measurement period.

7. The method, as set forth in claim 6, wherein determining the orbit comprises fitting an orbit to the historical ephemerides.

8. The method, as set forth in claim 6, wherein determining a position solution at each time t comprises:

determining an initial receiver position;

determining, in response to the historical ephemerides and the initial receiver position, a range from each space vehicle to the receiver;

determining a difference between the range of each space vehicle and the receiver pseudo-range output;

determining errors of the initial receiver position in response to the difference between the range of each space vehicle and the receiver pseudo-range output;

correct the initial receiver position with the errors; and iteratively repeating the above steps until the errors approach zero.

9. The method, as set forth in claim 6, wherein averaging the position solutions comprises:

summing all position solutions for each axis; and dividing the summed position solution for each axis by the number of position solutions in each axis.

10. A stand-alone global positioning system (GPS) receiver having a post-processor for accurate determination of a fixed position, the post-processor programmed to:

receive a plurality of pseudo-range measurements over a predetermined measurement period, the pseudo-range measurements determined from an ensemble of space vehicles at each of a plurality of times t over the measurement period;

obtain historical ephemerides of the ensemble of space vehicles over the measurement period, the historical ephemerides being free of the selective availability broadcast ephemeris error;

determine the historical ephemerides of the ensemble of space vehicles corresponding to each time t in response to the obtained historical ephemerides;

use the plurality of pseudo-range measurements and the historical ephemerides to determine a position solution at each time t; and average the position solutions over the measurement period.

11. The receiver, as set forth in claim 10, wherein the post-processor being further adapted to:

determine an orbit defined by the obtained historical ephemerides; and determine intermediate historical ephemerides between the historical ephemerides in the orbit.

12. The receiver, as set forth in claim 10, wherein the post-processor is programmed to determine a position solution at each time t comprises:

determining an initial receiver position;

determining, in response to the historical ephemerides and the initial receiver position, a range from each space vehicle to the receiver;

determining a difference between the range of each space vehicle and the receiver pseudo-range output;

determining errors of the initial receiver position in response to the difference between the range of each space vehicle and the receiver pseudo-range output;

correct the initial receiver position with the errors; and iteratively repeating the above steps until the errors approach zero.

13. The receiver, as set forth in claim 10, wherein the post-processor is further programmed to average the position solutions by:

summing all position solutions in each axis; and dividing the summed position solution in each axis by the number of position solutions in each axis.

* * * * *